United States Patent
Zatloukal (10) Patent No.: US 7,484,204 B2
(45) Date of Patent: Jan. 27, 2009

(54) SYSTEM AND METHOD FOR EXTENSIBLE TYPE REPOSITORIES

(75) Inventor: Kevin Zatloukal, Cambridge, MA (US)

(73) Assignee: BEA Systems, Inc., San Jose, CA (US)

( * ) Notice: Subject to any disclaimer, the term of this patent is extended or adjusted under 35 U.S.C. 154(b) by 745 days.

(21) Appl. No.: 10/891,744

(22) Filed: Jul. 15, 2004

(65) Prior Publication Data

US 2005/0015748 A1    Jan. 20, 2005

Related U.S. Application Data

(60) Provisional application No. 60/488,554, filed on Jul. 18, 2003.

(51) Int. Cl.
*G06F 9/45* (2006.01)

(52) U.S. Cl. .................... 717/141; 717/142; 717/143; 717/145

(58) Field of Classification Search .................. None
See application file for complete search history.

(56) References Cited

U.S. PATENT DOCUMENTS

| | | | | |
|---|---|---|---|---|
| 5,905,987 A | * | 5/1999 | Shutt et al. | 707/103 R |
| 6,542,912 B2 | * | 4/2003 | Meltzer et al. | 715/501.1 |

* cited by examiner

*Primary Examiner*—Chuck O Kendall
(74) *Attorney, Agent, or Firm*—Womble Carlyle Sandridge & Rice, PLLC (57) ABSTRACT

A system to provide an extensible type repository environment can include one or more type repositories, each of which is capable of representing a type system and maintaining one or more type definitions, each representing a type in the type system. Each type repository can also define a type repository interface, which is capable of providing a standard set of services for use by the system in interacting with the type repository. In addition, a compiler is capable of translating types defined in one or more language modules into types defined in one or more type repositories, performing name resolution, maintaining and resolving dependencies among types during recompilation of the types. This description is not intended to be a complete description of, or limit the scope of, the invention. Other features, aspects, and objects of the invention can be obtained from a review of the specification, the figures, and the claims.

44 Claims, 6 Drawing Sheets

SYSTEM AND METHOD FOR EXTENSIBLE TYPE REPOSITORIES

CLAIM OF PRIORITY

This application claims priority from the following application, which is hereby incorporated by reference in its entirety:

U.S. Provisional Patent Application No. 60/488,554, entitled SYSTEM AND METHOD FOR EXTENSIBLE TYPE REPOSITORIES by Kevin Zatloukal, filed Jul. 18, 2003.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE DISCLOSURE

The present invention disclosure relates generally to computer language type systems.

BACKGROUND

A type can be defined by the branch of mathematics known as type theory. Type theory categorizes a set of entities by placing each entity in one or more sets called types. An entity can be a member of more than one set and thus can have more than one type. A type system provides a set of rules for defining a set of types, which may be finite or infinite.

Type systems have found wide use in classifying computer data. All programming languages use some form of type system in order to distinguish between different sizes and categories of data. On the basic level, type systems are used to distinguish floating point data, integral data, character data, and pointer data. Type systems are also used to define structured data, such as a class in object-oriented programming. Databases employ type systems to define the content of tables and to define the operations that can be performed on tables and rows. Technologies like Extensible Markup Language (XML) use type systems to categorize different XML documents and fragments. (There are many possible applications of type systems to computer data. The preceding examples should be understood to be illustrative of the possible uses of type systems and should not in any way be construed to limit the possible applications of the present invention.)

As type systems evolve, they are becoming increasingly complicated, requiring more time, skill, knowledge and ultimately money to create type systems that are easily extensible. Consequently, the generation and deployment of extensible type systems is increasingly tedious and unnecessarily complicated for the average developer.

DETAILED DESCRIPTION

The invention is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Systems and methods according to the present invention can allow multiple type systems to coexist. These type systems can be used to categorize computer data in a computer system. Additional type systems can be added to the set of type systems as they are needed by the associated computer system.

Figure 1:
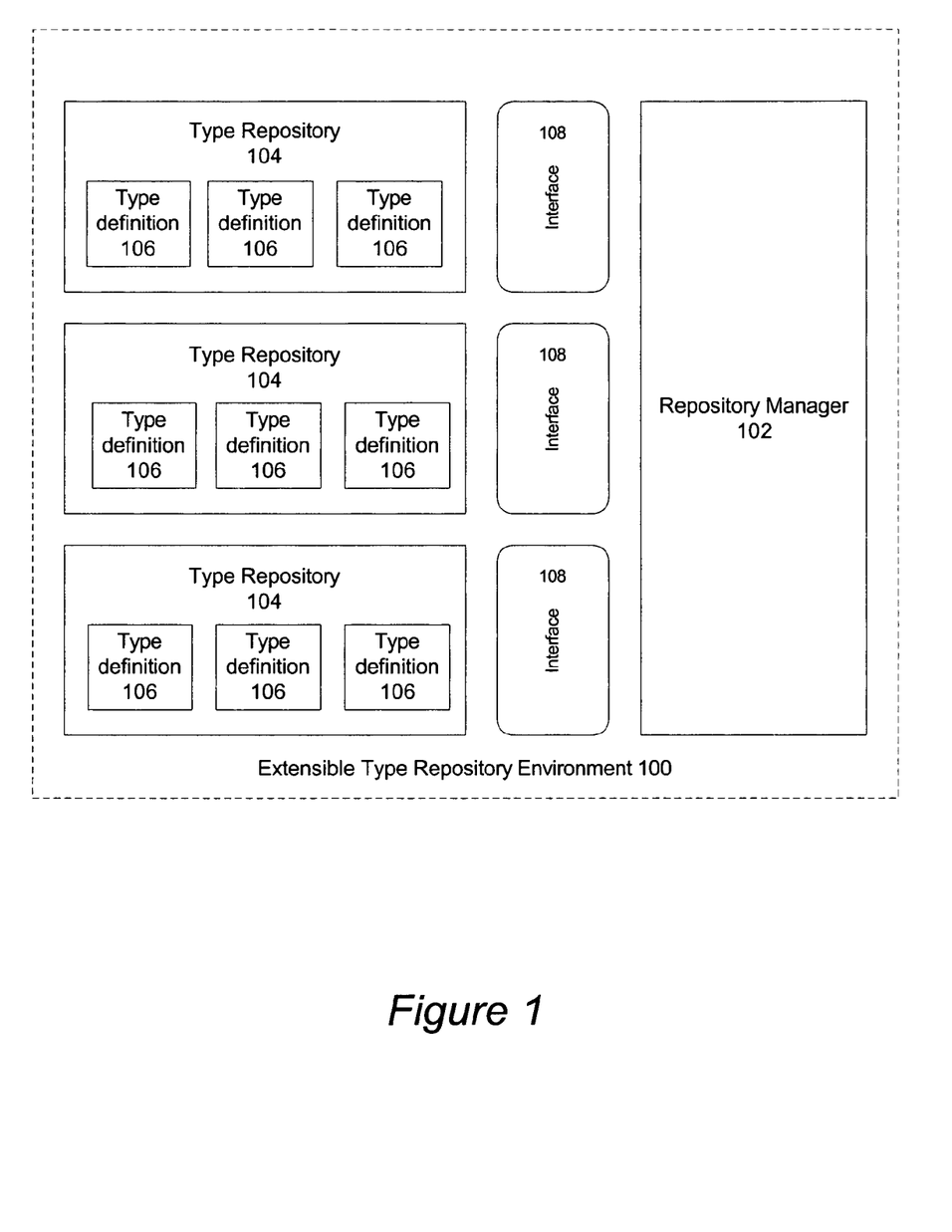
FIG. 1 is an illustration of an exemplary extensible type repository system in accordance with one embodiment of the invention.

FIG. 1 is an illustration of an extensible type repository environment 100 in an embodiment of the present invention. Although this diagram depicts components as functionally separate, such depiction is merely for illustrative purposes. It will be apparent to those skilled in the art that the components portrayed in this figure can be arbitrarily combined or divided into separate software, firmware and/or hardware components. Furthermore, it will also be apparent to those skilled in the art that such components, regardless of how they are combined or divided, can execute on the same computing device or multiple computing devices, and wherein the multiple computing devices can be connected by one or more networks.

Referring to FIG. 1, the extensible type repository environment 100 can maintain multiple type systems by means of an extensible set of type repositories 104, wherein new type repositories can be registered, initialized, and managed by a repository manager 102. Each type repository can represent a particular type system and can store a plurality of type definitions 106 for types in that type system. Each type repository can also implement a defined repository interface 108, which can be but is not limited to an API, a GUI, or a command-line interface that can provide a standard set of services to the repository manager. These services can include services for initializing new type systems as well as adding and accessing types stored in the type repository.

In one embodiment, a type system can refer to the type system of a programming language. By way of a non-limiting example, such a type system might be the type system for the Java® programming language. The Java® type system includes a set of basic types including: byte, short, char, int, float, double, and long. It also includes class and interface types. These types can be predefined by the Java® programming language, such as Java.lang.Class or Java.lang.String, or they can be defined by a particular Java® program. A type repository can maintain a Java® type system by maintaining a hierarchical data structure representing the structure of the Java® package system. The hierarchy can contain nodes for each package, with nodes for sub-packages being children of the nodes for their parent package. The type definitions themselves can be associated with the package to which they belong. The type definitions in such a repository can be representations of classes and interfaces defined in the Java® programming languages. The entries can include the name, fields, methods, superclasses, and implemented interfaces of the corresponding type.

In another embodiment, a type system can refer to a type system associated with Extensible Markup Language (XML). By way of a non-limiting example, such a type system can be the type system defined by an XML Schema, which allows families of related XML structures to be defined as a particular type. A type repository for an XML type system can store representations of such types that can be used to determine if a particular fragment of XML is a proper instance of that type. The representations can include a tree representation of an XML Schema or some other representation that is more efficient to process than raw text.

In another embodiment, a type system can be associated with a computer file system. A type repository can associate a type definition stored in the type repository with a computer file. The computer file can be stored in a file system associated with the computer system. The computer file can contain data that represents a definition of its associated type in the type repository. By way of non-limiting example, such a definition could be a source code definition of a type defined in a programming language. A reference to the computer file can be stored in the type repository so that the definition can be accessed rapidly.

In one embodiment, there can be a relationship between the file in which a type is defined and the name of the type in the file. By way of a non-limiting example, in the Java® programming language, it is expected that a file with a particular name will contain a type with a corresponding name. A type repository can ensure that such relationships are preserved by expecting a particular type to be present in a file and generating an error if it is not.

In one embodiment, a type can be defined by the existence of a file or directory in the file system. A type repository for such a type system can represent the type system by creating a hierarchical data structure that mirrors the directory structure of a relevant part of the file system. The type repository can associate information with each type. Such information can be associated with the contents of the files or directories or it can be associated with other aspects of the file or directory. Such information can include the last modified time of the file, the size of the file, information about the file's contents, or any other information that might be logically related to the file. When new files or directories are added to or removed from the file system, the type repository can be notified and given the opportunity to create corresponding types and associate information with those new types.

In one embodiment, type definitions stored in different type repositories can interact with each other. A type definition from a first type repository could be translated into a type for a second repository using for example, a lookup table, a compiler (as described later), or other methods well-known in the art. In addition, two types from different type repositories could be utilized in conjunction with each other in some manner. By way of a non-limiting example, a Java® type could be created based on an XML type, allowing an object to be created that could manipulate instances of the XML type. This creation could be implicit, such that no source file containing the Java® class is ever created.

Figure 2:
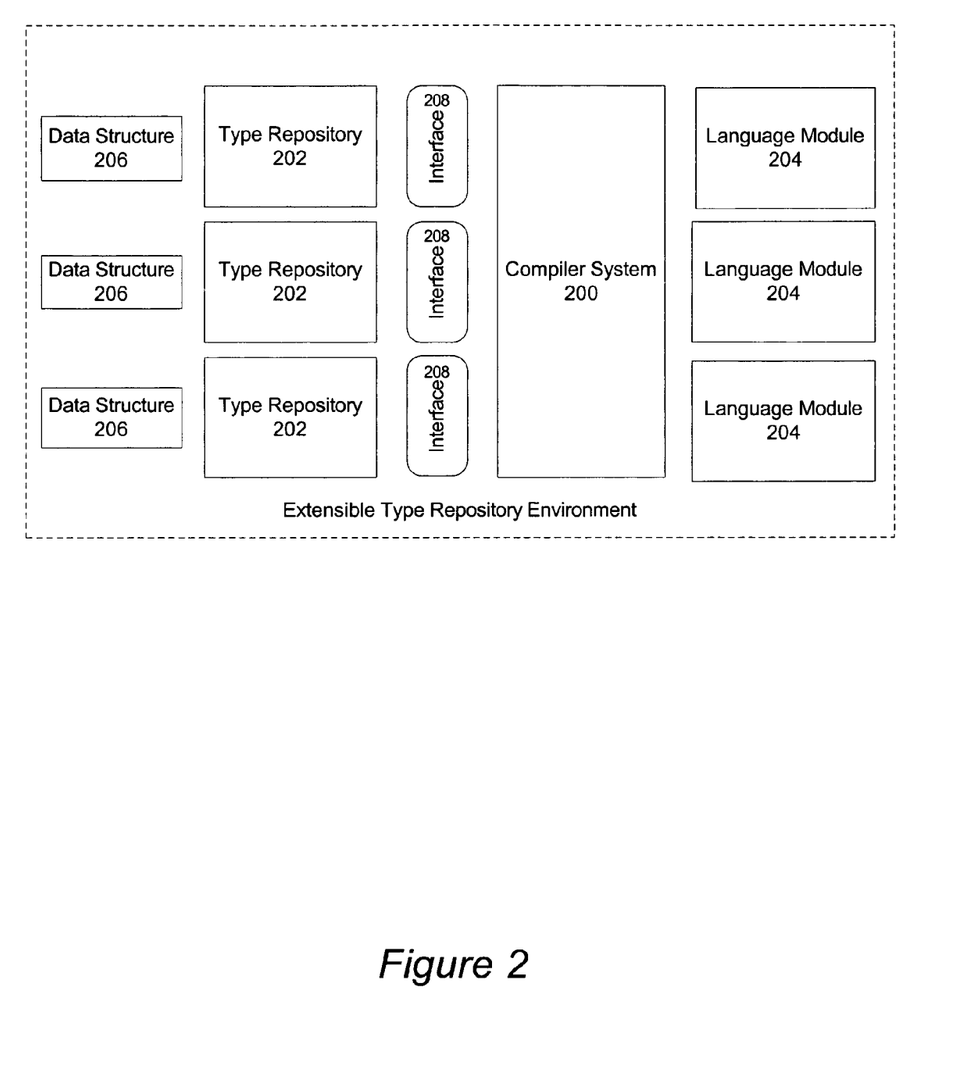
FIG. 2 is an illustration of an exemplary extensible type repository system associated with a compiler in accordance to one embodiment of the invention.

FIG. 2 is an illustration of an extensible type repository system associated with a compiler in an embodiment. Although this diagram depicts components as functionally separate, such depiction is merely for illustrative purposes. It will be apparent to those skilled in the art that the components portrayed in this figure can be arbitrarily combined or divided into separate software, firmware and/or hardware components. Furthermore, it will also be apparent to those skilled in the art that such components, regardless of how they are combined or divided, can execute on the same computing device or multiple computing devices, and wherein the multiple computing devices can be connected by one or more networks.

Referring to FIG. 2, a compiler system 200 can maintain a set of type repositories. Each type repository 202 can provide a defined type repository interface 208 to the compiler system. The compiler system can have multiple language modules 204 to support multiple languages and can compile types defined in different language modules into types defined in different type systems, represented by different type repositories. This can be especially useful when languages define types that are not compatible, such that types in one type system are not easily represented by types in the other system. However, multiple languages can share a single type system where such an arrangement is beneficial. By way of a non-limiting example, a compiler system might support both a language typically used for programming, such as Java®, as well as a language typically used for data representation, such as XML. Or a compiler system might support multiple, very different programming languages, such as a procedural language, a functional language, and a predicate language. A compiler system might also use a type repository to represent a portion of a file system associated with the files and directories that the compiler system is accessing. Alternatively, a compiler system might support several similar languages that all share the same type system so that they can interact, such as Java® and JavaScript.

In one embodiment, a type repository can be involved in the compilation process, such as by participating in certain phases of compilation. The type repository interface 208 can provide methods to retrieve information during the compilation process. Plus, the type repository interface can support different versions of these methods for single file and multiple file respectively during the compilation processes. When the compiler system is starting or ending a compilation process, it can call these methods on each type repository, it can call these methods on each type repository, giving the type repository an opportunity to perform initialization or cleanup tasks.

In one embodiment, new types can be added to a type repository during the compilation process. When preliminary information about a new type is discovered, a new entry for the type definition can be created in the type repository. By way of a non-limiting example, new types can be discovered after a file containing type definitions has been parsed. When the new type definitions in the file are discovered, any type definitions associated with that file that were already in the type repository can be removed. New entries for the new types can be created and added to the type repository. These entries can contain only the names of the new types. Further information about the types can be added as it is discovered in later phases of compilation.

In one embodiment, a type repository 202 can maintain references to data structures 206 provided by the compiler system. Such a data structure might be a parse tree for a type definition provided by a particular file. The type repository could use this information to rapidly determine the location of a particular type in the source code. When the compiler system needs to remove these data structures, perhaps to save space, references to the data structures in the type repository may prevent the data structures from being garbage collected. Alternatively, after the data structures are removed, the references held by the type repository may become invalid. The type repository interface 208 can provide a set of methods that the compiler system can invoke when it is about to remove certain data. The compiler system can inform the type repository of what data is going to be removed, by specifying the type or file associated with the data. In response to such a request, the type repository can eliminate all references to the data that may cause problems.

Figure 3:
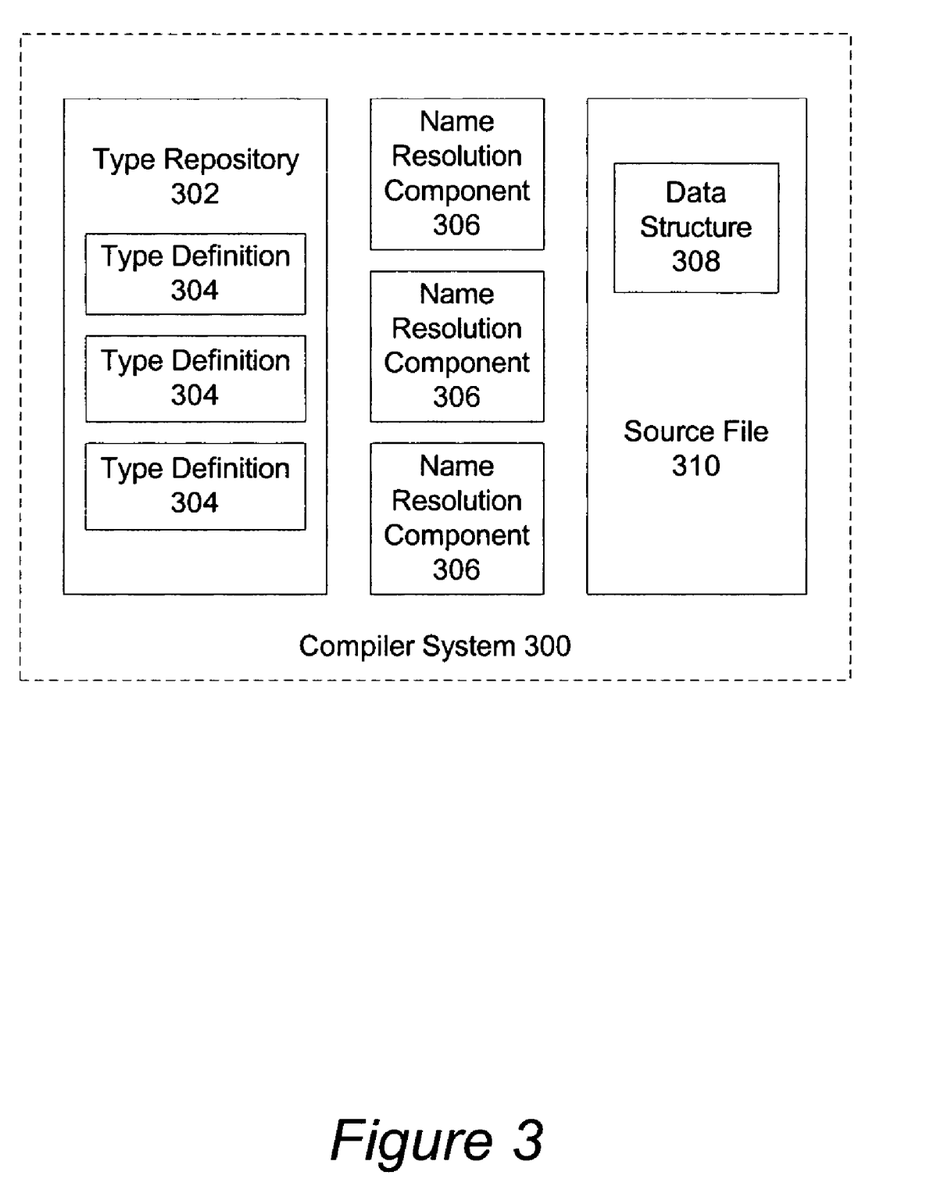
FIG. 3 is an illustration of an exemplary system to perform name resolution in accordance to one embodiment of the invention.

FIG. 3 is an illustration of a system for performing name resolution between type definitions and their corresponding data structures using a set of extensible type repositories in an embodiment. Although this diagram depicts components as functionally separate, such depiction is merely for illustrative purposes. It will be apparent to those skilled in the art that the components portrayed in this figure can be arbitrarily combined or divided into separate software, firmware and/or hardware components. Furthermore, it will also be apparent to those skilled in the art that such components, regardless of how they are combined or divided, can execute on the same computing device or multiple computing devices, and wherein the multiple computing devices can be connected by one or more networks.

Referring to FIG. 3, the compiler system 300 can use a set of type repositories 302 to perform name resolution. The information stored in a type definition 304 of a type repository can represent the public information about the type definition that can be referenced by other types. Information about a type definition that is not stored in the type repository during name resolution can be private information that is not accessible by other types. A type repository 302 may not have sufficient information to perform name resolution by itself. Although a type repository 302 is aware of the data structures of its associated type system, but generally will not understand the details of how a type should be defined in a particular programming language. Therefore, it can use services provided by the compiler system 300 in order to request certain information required to perform the name resolution. Such services provided by the compiler system 300 can be performed by a set of name resolution components 306, wherein each name resolution component can use data structures 308 that represent the contents of a source file 310 to determine the information needed for resolution. Different name resolution components in the set may perform name resolution for different type definitions 304 and each of these components can be used independently of one another to perform the resolution of a particular type definition.

In one embodiment, a type repository 302 can be responsible for ensuring that each name resolution component fills in its information in a type definition 304. Name resolution for one type may be requested by other types in the compiler system, such as when information about a type is required for compilation of a particular source file or when a first type is referenced by a second type. The type repository can determine what portion of name resolution need to be completed for any given type in the type repository to ensure that every type definition in the type repository is fully resolved at some point in the compilation process. By way of a non-limiting example, for a Java® type repository, name resolution of a class can include determining the fields, methods, modifiers, superclasses, and implemented interfaces of that class. This information can be determined by the compiler system after certain phases of compilation have been completed, such as the scanning and parsing phases. The compiler system can determine this information by examining the parse tree of the Java® source file defining the class. Some of this information is readily accessible: the superclasses of a class can be determined by examining the names after the "extends" keyword in the source code. Some of this information requires extra processing to determine: the methods of a class can only be determined after analyzing the class and its superclasses. The name resolution component that performs this analysis must have detailed knowledge of how a Java® type is defined in the Java® programming language.

Figure 4:
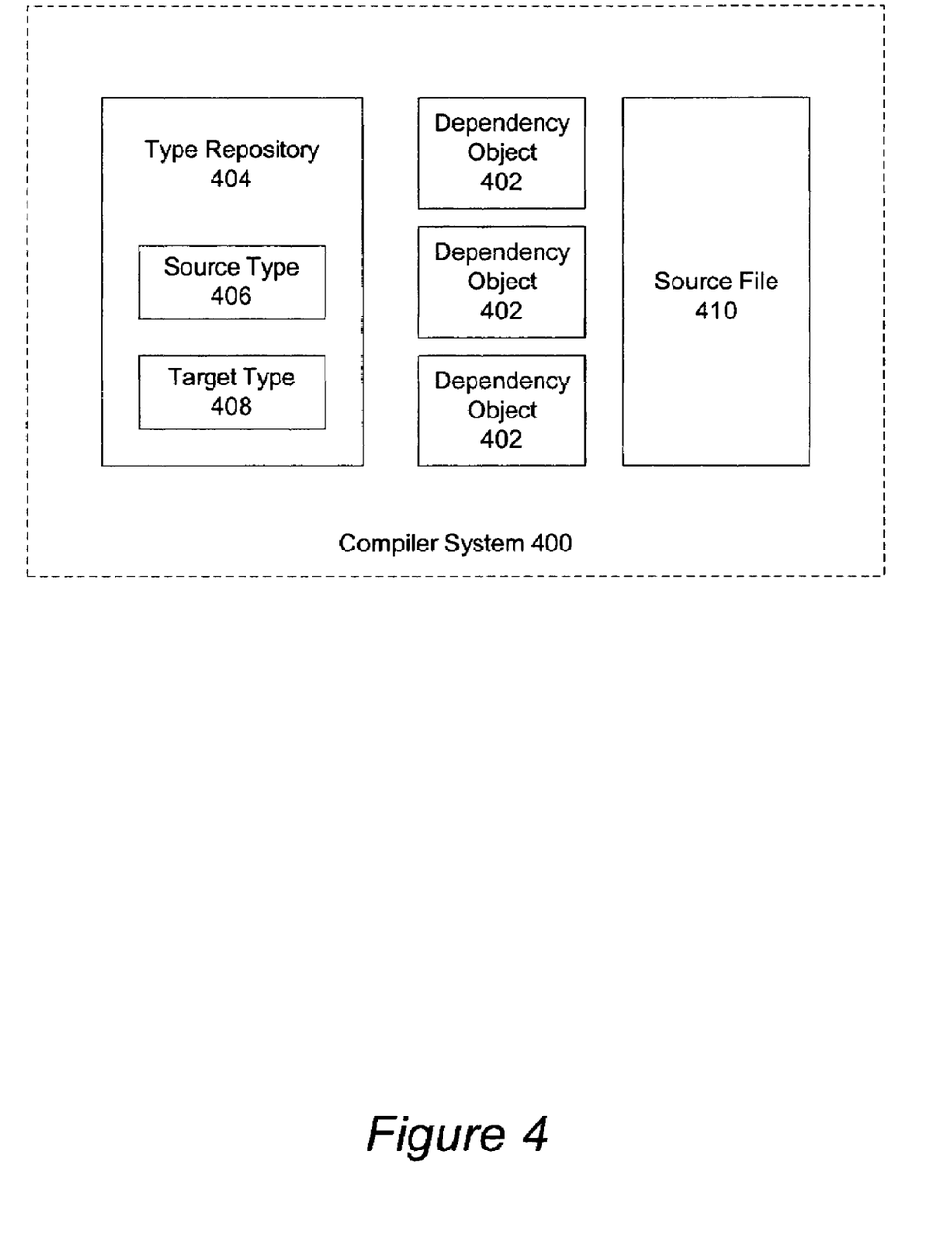
FIG. 4 is an illustration of an exemplary system to perform dependency analysis in accordance to one embodiment of the invention.

FIG. 4 is an illustration of an extensible set of type repositories used for dependency analysis in an embodiment. Although this diagram depicts components as functionally separate, such depiction is merely for illustrative purposes. It will be apparent to those skilled in the art that the components portrayed in this figure can be arbitrarily combined or divided into separate software, firmware and/or hardware components. Furthermore, it will also be apparent to those skilled in the art that such components, regardless of how they are combined or divided, can execute on the same computing device or multiple computing devices, and wherein the multiple computing devices can be connected by one or more networks.

Referring to FIG. 4, the compiler system 400 can utilize a plurality of dependency objects 402 associated with a particular file 410. These dependency objects can be created by a type repository 404 when the type repository detects a dependency between two types: a source type 406 and a target type 408. An entry for each type stored in the type repository 404 can have references to the dependency objects that represent dependencies that type has on other types. A dependency object can contain information about the source type of the dependency, the target type of the dependency, as well as refer to source file 410 that understands how to determine if the dependency exists. Dependency objects can be generated by performing transitive and intransitive dependency analysis to generate a set of changed types in the type repository, wherein each dependency object maintains a pair of types linked by a dependency in the set.

Figure 5:
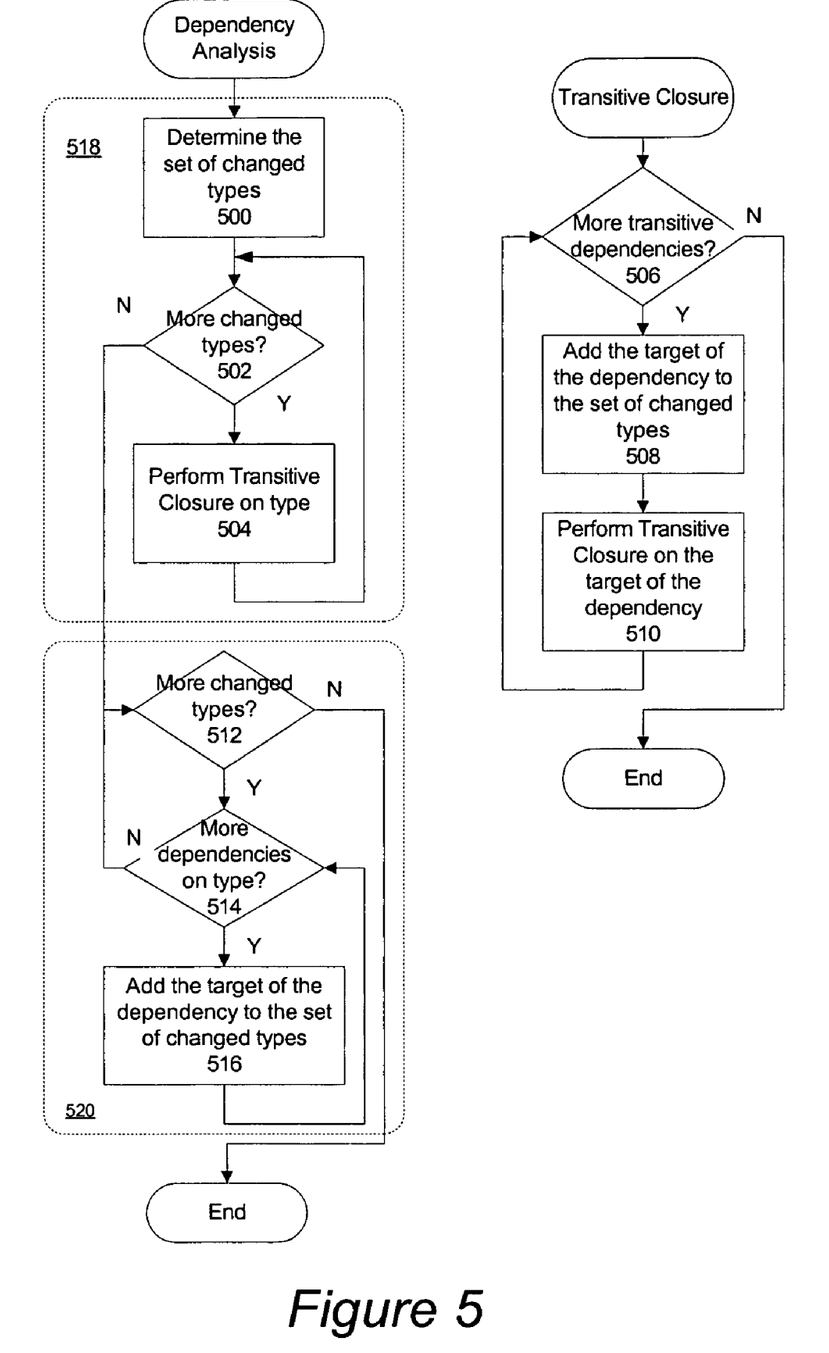
FIG. 5 is a flow chart of an exemplary type dependency determination method in accordance to one embodiment of the invention.

FIG. 5 is an exemplary process of performing dependency analysis that can be associated with the type definitions in the type repository in accordance with one embodiment of the invention. Although this figure depicts functional steps in a particular order for purposes of illustration, the process is not limited to any particular order or arrangement of steps. One skilled in the art will appreciate that the various steps portrayed in this figure could be omitted, rearranged, combined and/or adapted in various ways.

Referring to FIG. 5, a dependency analysis can be performed in two phases: the transitive and intransitive closure phase. By a non-limiting example, transitive dependency means that if type A depends on type B and type B depends on type C, type A also depends on type C, while type A may not be regarded as dependant on type C under intransitive dependency. During the first transitive closure phase 518, the method determines at step 500 the set of changed types, which are types subject to transitive dependency checking. In step 502, the method determines whether there are any more changed types to process. In step 504, the method performs a transitive closure on the changed type. During the transitive closure, the method determines whether there are more transitive dependencies to process in step 506. The target of a transitive dependency is added to the set of changed types in step 508. In step 510, the transitive closure process is invoked on the targets of the dependency. Once the transitive closure phase has been completed, the intransitive closure phase of the dependency analysis 520 begins. In step 512, the method determines if there are more changed types to process. In step 514, the method determines if there are more intransitive dependencies on the type. The target of each dependency is added to the set of changed types in step 516. Such dependency information can be used in various embodiments of the present invention for incremental recompilation of types suspected to have changed.

Figure 6:
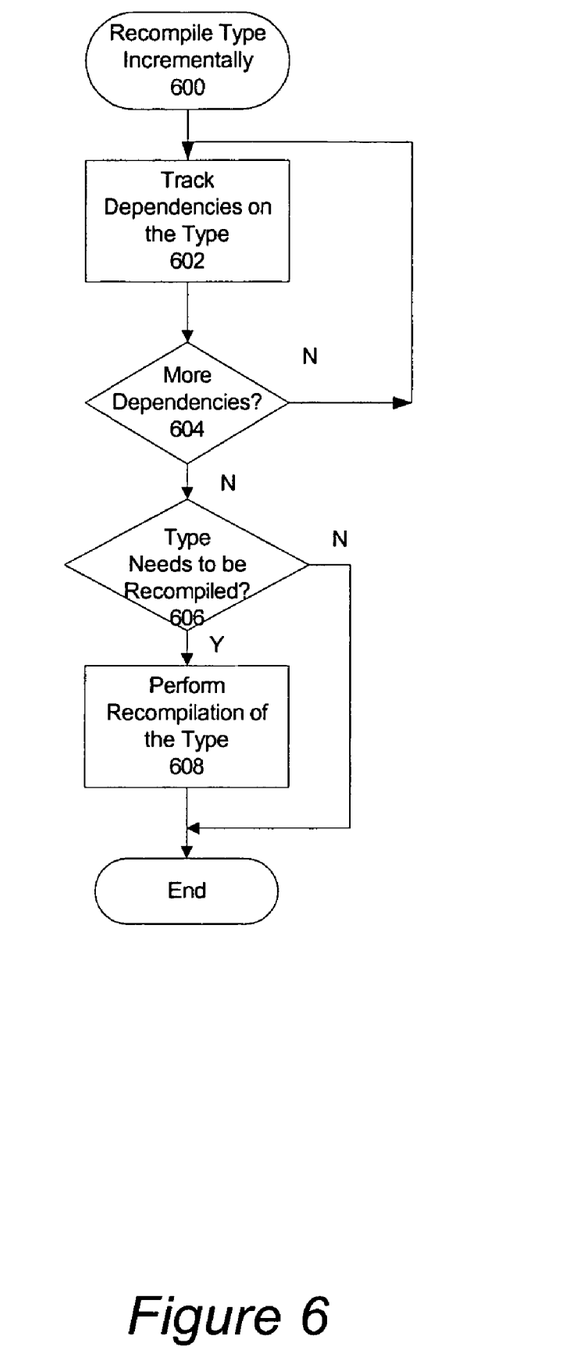
FIG. 6 is a flow chart of an exemplary compilation process utilizing dependency information in accordance to one embodiment of the invention.

FIG. 6 is a flow chart of a recompilation process using changed type information and dependencies in accordance to one embodiment of the invention. Although this figure depicts functional steps in a particular order for purposes of illustration, the process is not limited to any particular order or arrangement of steps. One skilled in the art will appreciate that the various steps portrayed in this figure could be omitted, rearranged, combined and/or adapted in various ways.

Referring to FIG. 6, step 600 starts the incremental recompilation of the set of changed types based on the set of changed types generated by the dependency analysis in FIG. 5. In step 602, each type A in the set of changed types is tracked for its dependencies. During this dependency tracking, step 604 checks the changed type A to see if it has any dependencies. If the changed type A depends on another type B, type B will be recursively tracked for its dependencies using the same process that starts at step 602. If type A does not depend on another type, step 606 checks if type A has been changed and needs to be recompiled. If any type along the dependency path of type A has been changed, it should then be recompiled first. Once all the types upon which type A depends have been checked and/or recompiled, the type A itself can be recompiled in step 608. By means of this process, the compiler system can incrementally recompile only the changed types and can avoid being forced to compile a type multiple times.

One embodiment may be implemented using a conventional general purpose or a specialized digital computer or microprocessor(s) programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of integrated circuits or by interconnecting an appropriate network of conventional component circuits, as will be readily apparent to those skilled in the art.

One embodiment includes a computer program product which is a storage medium (media) having instructions stored thereon/in which can be used to program a computer to perform any of the features presented herein. The storage medium can include, but is not limited to, any type of disk including floppy disks, optical discs, DVD, CD-ROMs, micro drive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, execution environments/containers, and applications.

The foregoing description of the preferred embodiments of the present invention has been provided for the purposes of illustration and description. It is not intended to be exhaustive or to limit the invention to the precise forms disclosed. Many modifications and variations will be apparent to the practitioner skilled in the art. Embodiments were chosen and described in order to best describe the principles of the invention and its practical application, thereby enabling others skilled in the art to understand the invention, the various embodiments and with various modifications that are suited to the particular use contemplated. It is intended that the scope of the invention be defined by the following claims and their equivalents.

What is claimed is:

1. A computer-implemented system to provide an extensible type repository environment, comprising:
one or more microprocessors;
a plurality of type repositories, wherein each type repository maintains a hierarchical data structure that contains definitions of one or more types in a type system, wherein a first of the plurality of type repositories defines a first type in a first type system and a second of the plurality of type repositories defines a second type in a second type system; and
a plurality of type repository interfaces, wherein each type repository interface is associated with and provides access to a type repository in the plurality of type repositories and defines a set of services provided by the type repository,.
wherein an object of the first type is created based on the second type system by creating the object of the first type so that it manipulates only instances of the second type.

2. The system of claim 1, wherein:
the set of services includes initializing the type repository, adding, accessing and/or deleting a type stored in the type repository.

3. The system of claim 1, further comprising:
a repository manager to register, and manage the one or more type repositories via the one or more type repository interfaces.

4. The system of claim 1, wherein:
the type system is associated with a computer file system, wherein a type definition in the type repository representing the type system is stored in a file in the computer file system.

5. The system of claim 1, wherein:
the type system is a programming language.

6. The system of claim 5, wherein:
the language is an object-oriented programming language.

7. The system of claim 5, wherein:
the language is the Extensible Markup Language (XML).

8. The system of claim 1, wherein:
the first type is translated into the second type.

9. A computer-implemented system to provide an extensible type repository environment, comprising:
one or more microprocessors;
a plurality of type systems, wherein each of the plurality of type systems is maintained in a separate type repository of a plurality of type repositories, wherein each of the plurality of type repositories is associated with a type repository interface, and wherein the type repository interface provides a set of services supported by the type repository; and
a compiler that includes a plurality of language modules, wherein each of the plurality of language modules is associated with a different programming language, wherein the compiler operates to compile one or more types defined in one of the plurality of language modules into one or more types in one of the plurality of type system,
wherein each of the plurality of type repositories maintains references to one or more data structures provided by the compiler, wherein each data structure is used by the type repository to determine a location of a particular type in a source code.

10. The system of claim 9, wherein:
the references to one or more data structures by the type repository are used to prevent the one or more data structures from being garbage collected.

11. The system of claim 9, wherein:
one of the plurality of language modules is for an object-oriented programming language.

12. The system of claim 9, wherein:
one of the plurality of language modules is for XML.

13. A computer-implemented system to perform name resolution during compilation, comprising:
one or more microprocessors;
a plurality of type repositories, wherein each type repository represents a type system and maintains public information of one or more type definitions associated with the type system, wherein the public information of one or more type definitions is accessible by other types; and
a plurality of name resolution components, wherein each name resolution component is associated with a type repository of the plurality of type repositories, wherein each of the plurality of name resolution components provides private information of one or more type definitions associated with the type system during name resolution, wherein the private information of one or more type definitions is not accessible by other types.

14. The system of claim 13, wherein:
each of the plurality of type repositories determines which portion of name resolution needs to be completed for a type in the type repository to ensure that every type definition in the type repository is fully resolved during compilation.

15. A computer-implemented system to perform dependency analysis during compilation, comprising:
one or more microprocessors;
a type repository that creates a plurality of dependency object wherein each one of the plurality of dependency objects is detected between a source type and a target type, wherein both the source type and the target type are defined in the type repository; and
a compiler to utilize the plurality of dependency objects which is associated with a particular file to perform incremental recompilation of a set of changed types in the type repository based on a dependency analysis, and wherein each one of the set of changed types is compiled only once.

16. The system of claim 15, wherein:
the dependency analysis is performed both in a transitive phase and an intransitive phase.

17. A method to provide an extensible type repository environment, comprising:
providing plurality of type repositories, wherein each type repository maintains a hierarchical data structure that contains definitions of one or more types in a type system, wherein a first of the plurality of type repositories defines a first type in a first type system and a second of the plurality of type repositories defines a second type in a second type system;
providing a plurality of type repository interfaces, wherein each type repository interface is associated with and provides access to a type repository in the plurality of type repositories and defines a set of services provided by the type repository: and
creating an object of the first type based on the second type system by creating the object of the first type to manipulate only instances of the second type.

18. The method of claim 17, further comprising at least one of:
initializing the type repository; and
adding, accessing and/or deleting a type stored in the type repository via the set of services.

19. The method of claim 17, further comprising:
registering a new type repository; and
managing the one or more type repositories via a repository manager.

20. The method of claim 17, further comprising:
associating the type system with a computer file system, wherein a type definition in a type repository representing the type system is stored in a file in the computer file system.

21. The method of claim 17, further comprising:
translating the first type into the second type.

22. A method to provide an extensible type repository environment, comprising:
providing a plurality of type systems, wherein each of the plurality type system is maintained in a separate type repository of a plurality of type repositories, wherein each of the plurality of type repositories is associated with a type repository interface, and wherein the type repository interface provides a set of services supported by the type repository;
providing a compiler that includes a plurality of language modules wherein each one of the plurality of language modules is associated with a different programming language, wherein the compiler operates to compile one or more types defined in one of the plurality of language modules into one or more types in one of the plurality of type system,
maintaining at each of the plurality of type repositories references to one or more data structures provided by the compiler, wherein each data structure is used by the type repository to determine a location of a particular type in a source code.

23. The method of claim 22, wherein:
the references to one or more data structures by the type repository are used to prevent the one or more data structures from being garbage collected.

24. A method to perform name resolution during compilation, comprising:
providing a plurality of type repositories, wherein each type repository represents a type system and maintains public information of one or more type definitions associated with the type system, wherein the public information of one or more type definition is accessible by other types; and
providing a plurality of name resolution components, wherein each name resolution component is associated with a type repository of the plurality of type repositories, wherein each of the plurality of name resolution components provides private information of one or more type definitions associated with the type system during name resolution, wherein the private information of one or more type definition is not accessible by other types.

25. The method of claim 24, wherein:
each of the plurality of type repository determines which portion of name resolution needs to be completed for a type in the type repository to ensure that every type definition in the type repository is fully resolved during compilation.

26. A method to perform dependency analysis during compilation, comprising:
provided a type repository that creates a plurality of dependency object, wherein each one of the plurality of dependency objects is detected between a source type and a target type, wherein both the source type and the target type are defined in the one repository; and
providing a compiler to utilize the plurality of dependency objects which is associated with a particular file to perform incremental recompilation of a set of changed types in the type repository based on a dependency analysis, wherein each one of the set of changed types is compiled only once.

27. The method of claim 26. further comprising:
determining the set of changed types;
expanding the set of changed types by adding to it the set of types it depends upon utilizing the one or more dependencies; and
recompiling the set of changed types.

28. The method of claim 27, wherein:
the expanding step comprises at least one of:
adding each type in the transitive closure of the set of changed types into the set of changed types; and
adding each type in the intransitive closure of the set of changed types into the set of changed types.

29. The method of claim 27, wherein:
the recompiling step comprises at least one of:
tracking the dependencies of a type in the set of changed types;
recompiling the type if it has changed and has no more dependencies;
recompiling the type if a type it depends upon has been recompiled.

30. A machine readable storage medium having instructions stored thereon that when executed by a processor cause a system to:
provide a plurality of type repositories, wherein each type repository maintains a hierarchical data structure that contains definitions of one or more types in a type system, wherein a first of the plurality of type repositories defines a first type in a first type system and a second of the plurality of type repositories defines a second type in a second type system;
provide a plurality of type repository interfaces, wherein each type repository interface is associated with and provides access to a type repository in the plurality of type repositories and defines a set of services provided by the type repository; and
create an object of the first type based on the second type system by creating the object of the first type to manipulate only instances of the second type.

31. The machine readable storage medium of claim 30, further comprising instructions that when executed cause the system to perform at least one of:
initializing the type repository; and
adding, accessing and/or deleting a type stored in the type repository via the set of services.

32. The machine readable storage medium of claim 30, further comprising instructions that when executed cause the system to:
register a new type repository; and
manage the one or more type repositories via a repository manager.

33. The machine readable storage medium of claim 30, further comprising instructions that when executed cause the system to:
associate the type system with a computer file system, wherein a type definition in a type repository representing the type system is stored in a file in the computer file system.

34. The machine readable storage medium of claim 30, further comprising instructions that when executed cause the system to:
translate the first type into the second type.

35. A machine readable storage medium having instructions stored thereon that when executed by a processor cause a system to:
provide a plurality of type system, wherein each of the plurality of type systems is maintained in a separate type repository of a plurality of type repositories, wherein each of the plurality of type repositories is associated with a type repository interface, and wherein the type repository interface provides a set of services supported by the type repository;
provide a compiler that includes a plurality of language modules wherein each one of the plurality of language modules is associated with a different programming language, wherein the compiler operates to compile one or more types defined in one of the plurality of language modules into one or more types in one of the plurality of type systems,
maintain at each of the plurality of type repositories references to one or more data structures provided by the compiler, wherein each data structure is used by the type repository to determine a location of a particular type in a source code.

36. The machine readable storage medium of claim 35, wherein:
the references to one or more data structures by the type repository prevent the one or more data structures from being garbage collected.

37. A machine readable storage medium having instructions stored thereon that when executed by a processor cause a system to:
provide a plurality of type repositories, wherein each type repository represents a type system and maintains public information of one or more type definitions associated with the type system, wherein the public information of one or more type definition is accessible by other types; and
provide a plurality of name resolution components, wherein each name resolution component is associated with a type repository of the plurality of type repositories, wherein each of the plurality of name resolution components provides private information of one or more type definitions associated with the type system during name resolution. wherein the private information of one or more type definition is not accessible by other types.

38. The machine readable storage medium of claim 37, wherein:
each of the plurality of type repository determines which portion of name resolution needs to be completed for a type in the type repository to ensure that every type definition in the type repository is fully resolved during compilation.

39. A machine readable storage medium having instructions stored thereon that when executed by a processor cause a system to:
provide a type repository that creates a plurality of dependency objects, wherein each one of the plurality of dependency objects is detected between a source type and a target type, wherein both the source type and the target type are defined in the type repository; and provide a compiler to utilize the plurality of dependency objects which is associated with a particular file to perform incremental recompilation of a set of changed types in the type repository based on a dependency analysis, wherein each one of the set of changed types is compiled only once.

40. The machine readable storage medium of claim 39, further comprising instructions that when executed cause the system to:

determine a set of changed types;

expand the set of changed types by adding to it the set of types it depends upon utilizing the one or more dependencies; and recompile the set of changed types.

41. The machine readable storage medium of claim 40, further comprising instructions that when executed cause the system to perform at least one of:

adding each type in the transitive closure of the set of changed type into the set of changed types; and adding each type in the intransitive closure of the set of changed type into the set of changed types.

42. The machine readable storage medium of claim 40, further comprising instructions that when executed cause the system to perform at least one of:

tracking the dependencies of a type in the set of changed types;

recompiling the type if it has changed and has no more dependencies;

recompiling the type if a type it depends upon has been recompiled.

43. A computer-implemented system to provide an extensible type repository environment, comprising:

one or more microprocessors;

means for providing a plurality of type repositories, wherein each type repository maintains a hierarchical data structure that contains definitions of one or more types in a type system, wherein a first of the a plurality of type repositories defines a first type in a first type system and a second of the plurality of type repositories defines a second type in a second type system;

means for providing a plurality of type repository interfaces, wherein each type repository interface is associated with and provides access to a type repository in the plurality of type repositories and defines a set of services provided by the type repository; and means for creating an object of the first type based on the second type system by creating the object of the first type so that it manipulates only instances of the second type.

44. A computer-implemented system to provide an extensible type repository environment, comprising:

one or more microprocessors;

a plurality of type repositories, wherein each type repository represents a type system in a plurality of type systems and maintains one or more type definitions, wherein each of the one or more type definitions represents a type in the type system, wherein a first type is defined in a first of the one or more type repositories that is associated with a programming language and a second type is defined in a second of the one or more type repositories that is associated with data representation; and a plurality of type repository interfaces wherein each type repository interface is defined by a type repository in the one or more type repositories and capable of providing a set of services to interact with the type repository, wherein an object of the first type is created based on the second type without creating source file in a programming language, and the object of the first type manipulates instances of the second type.

* * * * *

UNITED STATES PATENT AND TRADEMARK OFFICE
CERTIFICATE OF CORRECTION

PATENT NO. : 7,484,204 B2
APPLICATION NO. : 10/891744
DATED : January 27, 2009
INVENTOR(S) : Zatloukal It is certified that error appears in the above-identified patent and that said Letters Patent is hereby corrected as shown below:

In column 8, line 23, in claim 1, delete "repository,." and insert -- repository, --, therefor.

In column 9, line 41, in claim 15, delete "object" and insert -- objects, --, therefor.

In column 9, line 56, in claim 17, after "providing" insert -- a --.

In column 9, line 67, in claim 17, delete "repository:" and insert -- repository; --, therefor.

In column 11, line 4, in claim 26, delete "object," and insert -- objects, --, therefor.

In column 11, line 7, in claim 26, delete "one" and insert -- type --, therefor.

In column 11, line 14, in claim 27, delete "26." and insert -- 26, --, therefor.

In column 12, line 12, in claim 35, delete "system," and insert -- systems, --, therefor.

In column 12, line 51, in claim 37, delete "resolution." and insert -- resolution, --, therefor.

In column 13, line 19, in claim 41, delete "type" and insert -- types --, therefor.

In column 13, line 21, in claim 41, delete "type" and insert -- types --, therefor.

In column 14, line 2, in claim 43, after "the" delete "a".

Signed and Sealed this

Eighteenth Day of May, 2010

David J. Kappos
*Director of the United States Patent and Trademark Office*